March 1, 1960  J. H. McGINN  2,926,783
BALLISTIC PARTICLE SIZE DISCRIMINATOR
Filed Nov. 6, 1956  3 Sheets-Sheet 1

$$R = K_1 \frac{\rho d}{\rho'} \ln\left(1 + K_2 \frac{V_0 d}{\mu}\right)$$

INVENTOR.
JOHN HOLTON McGINN
BY
ATTORNEYS

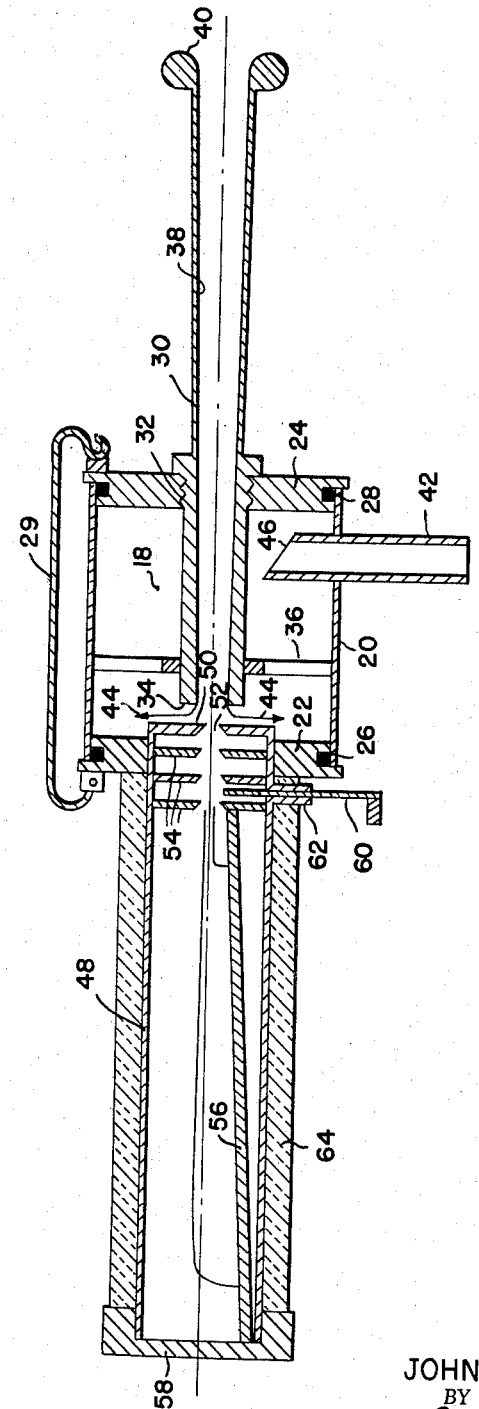

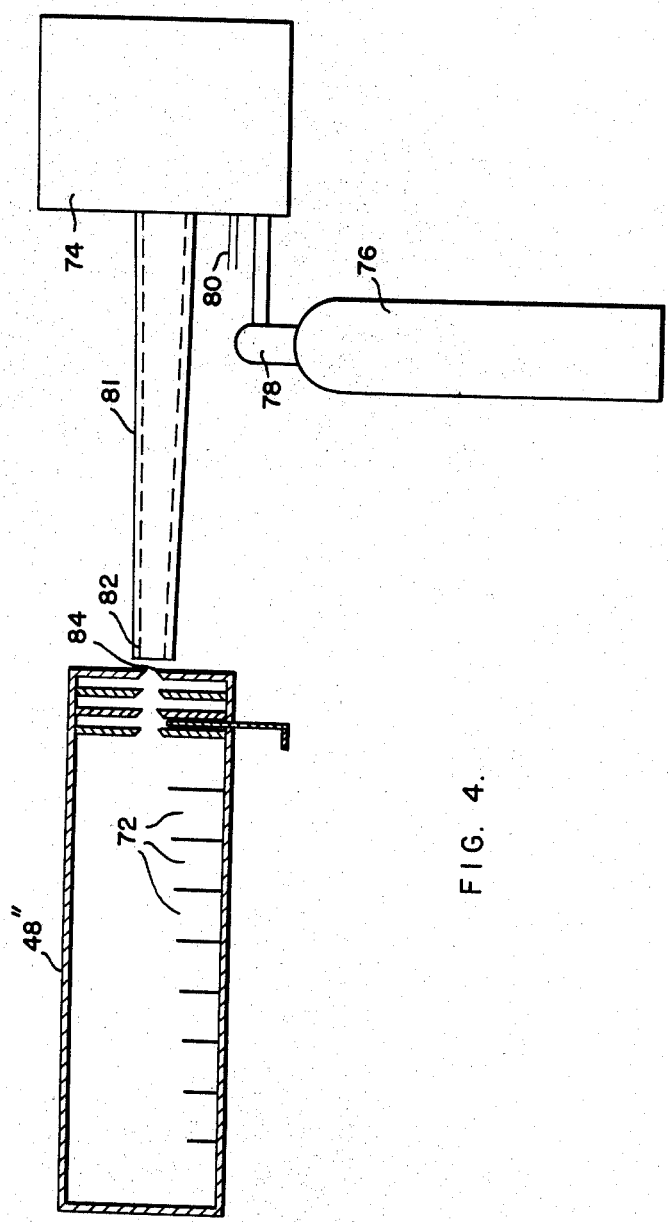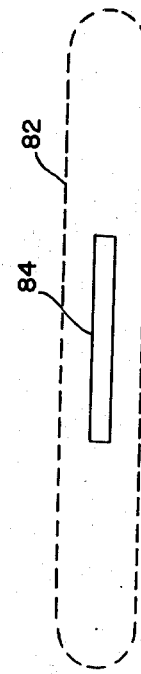
FIG. 4.
FIG. 5.
INVENTOR.
JOHN HOLTON McGINN
BY
ATTORNEYS 2,926,783
Patented Mar. 1, 1960

2,926,783
BALLISTIC PARTICLE SIZE DISCRIMINATOR

John Holton McGinn, Philadelphia, Pa.

Application November 6, 1956, Serial No. 620,709

14 Claims. (Cl. 209—135)

This invention relates to a ballistic particle size discriminator particularly adapted for the separation, either for sampling or collection purposes of airborne particulate matter according to size.

Particulate matter, either solid or liquid, suspended in air or other gas for any substantial length of time is generally designated as an aerosol. Such aerosols have become of considerable commercial importance in their uses for the dispersion of paints, insecticides, fixatives, etc., and sampling to detect the distribution of sizes of particulate matter therein is of importance, for example, as a check on the properties of the aerosol itself and to determine the effectiveness of apparatus to produce aerohols having desired characteristics. Furthermore, aerosol formation may be a step in the production of fine particles of materials such as plastics, and in such cases not only is sampling desirable for control of production of particle size but discrimination of particles according to size may be important in the collecting operation.

In accordance with the present invention discrimination of particles according to size is effected in a novel fashion in which a high degree of discrimination is attained. The invention is particularly applicable to the grading of particulate matter in the 2 to 200 micron size range, a range within which there falls the particulate matter of most aerosols of industrial importance.

Heretofore, the most effective discriminator has been the cascade impactor in which an aerosol is drawn through a series of orifices in such fashion that the aerosol leaving each orifice is caused to flow in a curved path. The successive orifices are so aranged that the velocities of flow increase successively from one to the other. Surfaces are provided adjacent to the orifices so that particles thrown outwardly centrifugally, or perhaps more accurately stated, particles whose inertia is not overcome by the drag of the fluid, impinge upon the surfaces and are there retained for examination. This cascade separator, however, is not effective for any high degree of discrimination, there being very broad ranges in size of the particles collected at each of the orifices.

The operation in accordance with the present invention involves, essentially, the projection of the particles to be separated at a substantially constant velocity at a point of entry into a region of still air or other gas. Even if particles of different sizes have somewhat different velocities at the point of entry, all particles of a given size have substantially the same velocity. As a result, each particle follows a trajectory which is determined by its initial velocity and the drag of the still air or gas. By causing the trajectories to traverse a surface defined either by a physical surface of a collecting member or by entrances to a series of bins, or defined by an optical plane, or otherwise, the discrimination is effected.

The general objects of the invention are concerned with the attainment of the discrimination just mentioned and will be more apparent from the following description, read in conjunction with the accompanying drawings, in which:

Figure 2 is an axial section of a form of apparatus particularly designed for sampling of aerosols;

Figure 4 is a diagrammatic view partly in section showing the type of apparatus which may be provided for the collection in quantity of small particles discriminated as to size; and Figure 5 is a diagram indicating an orifice arrangement which may be used when relatively large quantities of particles are to be collected.

Throughout the following to avoid complexity of description it will be understood that where particles are referred to not only solid particles but liquid droplets are included. Furthermore, while reference will be made particularly to air as a suspending gas of an aerosol it will be understood that other gases or vapors are also included.

Figure 1:
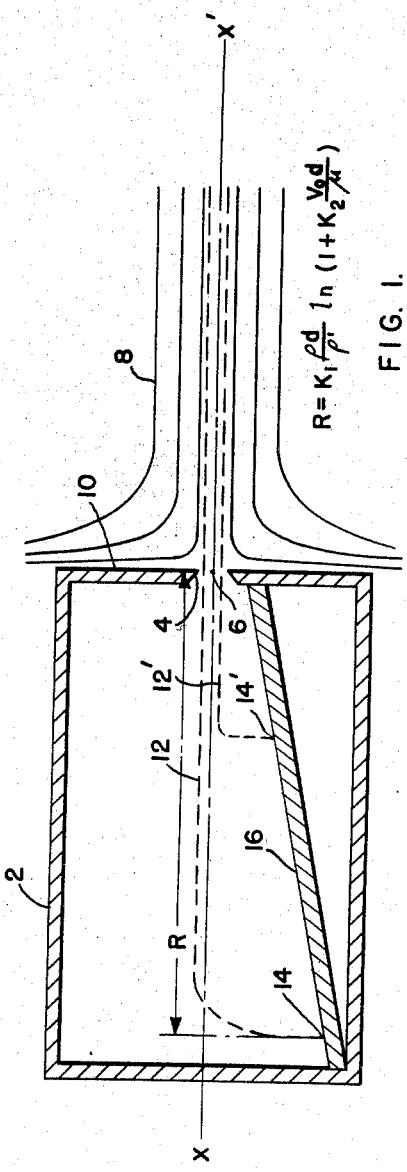
Figure 1 is a diagrammatic sectional view provided to illustrate the principles involved, there being also indicated in Figure 1 an expression which approximately gives the range of spherical particles.

Referring first to Figure 1, there is indicated at 2 a chamber which is enclosed except for an aperture 4 which, initially, may be regarded as circular and which defines at its center 6 what will be hereafter referred to as a stagnation point. Assuming that a jet of air carrying particles impinges on a plane wall 10 in which the aperture 4 is provided, the jet being indicated by its streamlines 8, the following will occur:

Considering the axis of the jet to be horizontal and that of the aperture 4 and that the surface 10 is vertical and at right angles to this axis, idealized steady state conditions would give rise to a pressure in the chamber 2 equal to the stagnation pressure of the jet occurring at the point 6 and consequently there would be no flow of air through the aperture 4. Under such conditions the air within the chamber 2 is still and any particle carried by the jet in line with the aperture 4 will, as it passes the aperture, move into this region of still air so that its trajectory will be determined by the velocity with which it passes the orifice, its mass, the drag of the still air thereon, and the acceleration due to gravity. (It may be noted that in some cases forces of an electrical nature might be involved, but in the fashion in which the invention is desirably carried out these forces are substantially eliminated and play no part in the operation.) The effect of the drag and acceleration of gravity depends, of course, upon the characteristics of the particle, namely its size, shape, density, and to some extent in the case of liquid particles, the changes in shape which may be due to its varying velocity with respect to the air, its surface tension, and perhaps other factors. If particles are homogeneous in composition, if, considering shape, they enter the aperture 4 similarly oriented, and if the entrainment in the jet has been such as to cause at least particles of the same size to enter the orifice at approximately the same velocity, then the trajectories diagrammed at 12 and 12′ which particles follow will be uniquely related to the particle size with the result that the particles will reach definite positions 14 and 14′ where they intersect a surface such as indicated at 16. The trajectories indicated at 12 and 12′ are for illustrative purposes considerably distorted from the shapes which would exist for particles of the very small sizes constituting aerosols. Such particles would deviate from the condition of parallelism with the axis $x-x'$ only very slightly until their velocities became very low. Then they will very slowly fall under the action of gravity to the intersection points such as 14 and 14′. This may be readily understood when it is considered that a spherical particle five microns in diameter will require 3.3 seconds to fall a distance of 0.10 inch. Thus the trajectories actually have "knees" of quite small radii of curvature for small particles, with larger particles the radii being greater, so that a complete trajectory would approximate in appearance a straight line running parallel to the axis $x-x'$ followed by another straight line extending substantially vertically.

The distribution of particles reaching a surface such as 16 may be best visualized by assuming spherical particles, for which theoretical calculations may be made, and talking about the "range" R thereof measured from the orifice 4 parallel to the axis $x-x'$ to the points 14 and 14' at which they come to rest on a surface such as 16, noting, that as just stated, the trajectories have actually sharp "knees" with the major part of their fall nearly vertical. For a spherical particle the range is given to a good degree of approximation by the expression for R in Figure 1, wherein $d$ and $\rho$ are, respectively, the diameter and the density of the particle, $\rho'$ and $\mu$ are respectively the density and viscosity of the air, $V_0$ is the initial velocity of the particle as it enters the chamber through the aperture, and $K_1$ and $K_2$ are constants, the logarithm being the natural logarithm. It will be evident that for particles of the same material, i.e., the same density, and with the other terms of the expression constant except for the particle diameter, the range is approximately linearly proportional to the diameter, since the logarithmic term represents a function which varies only relatively slowly with change of diameter $d$.

Qualitatively this behavior can be deduced as generally true for particles of other shapes from the fact that the kinetic energy of a particle passing through the aperture is proportional to the cube of a characteristic dimension whereas the work done by the still air in dissipating this energy is at most proportional to the square of the same diameter. The range will therefore be proportional to a power of such dimension which varies between 1 and 2 depending on the Reynold's number. This argument applies to particles of irregular shape provided the orientation thereof with respect to the axis of motion is approximately the same. For particles of similar shape but of different sizes this is usually approximately true, the particles being oriented by the drag of the air in the jet.

It may also be noted that there is, under steady state conditions, nearly the same velocity for all such particles as occur in an aerosol at the location of the aperture 4 if the particles have been entrained in the jet sufficiently distant from the stagnation point 6, since small particles of the usual aerosol size will attain substantially the full velocity of the entraining air flow in the traversal of a quite short distance; even assuming that they start from rest, attainment of substantially the full velocity of the jet will occur in a distance corresponding to the range, as that term is herein used. Thus, they are presented to the aperture 4 at substantially uniform velocity irrespective of size or shape.

Reference may now be made to Figure 2 which illustrates a device for sampling aerosols which has a high degree of discriminating action and which effectively achieves the theoretical conditions which are required for optimum operation.

A chamber 18 is provided by a cylinder 20 and end plates 22 and 24 which are sealed to the cylinder 20 through the use of O-rings 26 and 28, the assembly being desirably maintained by a series of spring clips 29 which may be readily released to permit disassembly for cleaning and subsequent reassembly. A nozzle tube 30 is threaded through the plate 24 at 32 and terminates in an orifice at 34 beyond the point where it extends through a central opening in a supporting spider 36 secured in the tube 20. This support is provided to insure accurate axial alignment of the parts which is necessary for the attainment of uniform results. The bore 38 of the nozzle tube 30 may be cylindrical but desirably converges in the direction of flow therethrough, this convergence serving to reduce turbulence in the flow and to focus the particles to enhance the collimation of the particles which pass through an aperture corresponding to 4 of Figure 1. The entrance end of the tube 30 is desirably rounded as indicated at 40 to minimize any disturbing effect the instrument may have on the aerosol, this being a requirement for unbiased sampling. Extending through the wall of the cylinder 20 is a tube 42 arranged for connection to a constant speed vacuum pump for the maintenance of a jet of the aerosol through the tube 30. This tube 42 desirably enters the chamber 18 at a location substantially removed from the exit end 34 of tube 30 so that the air flow indicated by the arrows 44 is uniform in all radial directions about the axis of the tube. This uniformity of flow is further improved by having the end of tube 42 which enters the chamber 18 bevelled as indicated at 46 to afford an entrance directed away from the end 34 of tube 30. For uniformity of sampling the vacuum pump should operate at constant displacement and the pressure of the aerosol at the entrance to tube 30 should be constant.

A tube 48 is secured in the plate 22 and the inner end thereof is closed by a disc 50 having a surface perpendicular to the axis of the tube 48 which axis is also the axis of the tube 30 and of the cylinder 20. For proper results this axial alignment must be precisely maintained. The disc 50 is provided with an aperture 52 also centered on the axis. As shown in Figure 2 this aperture should have a sharp edge provided by bevelling on the side away from the impinging jet. If the edge is not bevelled, there is scattering and consequent loss of discrimination.

Beyond the aperture 52 in the direction of motion of the particles are a series of baffles 54 each of which is provided with an aperture slightly larger than the aperture 52 and similarly provided with sharp edges by bevelling as shown. The purpose of these apertures is to damp out turbulence produced at the aperture 52 so that toward the left of the arrangement of baffles the air within the tube 48 is quiescent to correspond to the theoretically desired conditions for deceleration of the particles. A member 56 is located within the tube 48 for the collection of the particles. This may, for example, consist of a sheet of paper or glass which, for the collection of dry solid particles may contain a sticky coating on its upper surface such as provided by a gelatin-glycerin composition or the like. This collecting surface desirably slopes as indicated. At its end closest to the aperture it is relatively close to the axis. This is desirable since at this end the smallest particles are collected and it is undesirable to have them drop through any considerable distance because of the possible effect on them of even slight air currents. On the other hand, at its outer end, the surface 56 is desirably more distant from the axis since otherwise the larger particles would reach it at an angle which might involve sliding or ricochet action. It has been found quite satisfactory to have the collecting surface of 56 inclined at an angle of approximately 10° to 15° relative to the axis of the apparatus.

The outer end of the tube 48 is closed by a cap 58.

A shutter 60 is mounted in a guide 62 to move through the wall of tube 48 across the apertures in the baffles 54, this shutter being moved outwardly to start a sampling period and inwardly to end it. This shutter is desirable since if the sampling were started and stopped by starting and stopping flow of air through tube 42 transient conditions would occur giving rise to serious errors in results.

Thermoinsulation 64 surrounds the chamber 48 to minimize convection currents in the air therein which might affect, in particular, the path of major fall of the particles. The walls of the chamber 48 and the baffles 54 as well as other parts of the apparatus which come in close proximity to the suspended particles are metallic whereby there is avoided the existence of electrostatic fields which might affect the trajectories of the particles. However, in accordance with the invention, it might in some cases be desirable to set up predetermined electrical fields with the idea of intentionally producing particular movements of the particles. Usually, however, gravity is depended upon to produce particle fall, the axis of the apparatus being horizontal.

While the apparatus may involve a considerable range of dimensional aspects, it will be informative to set out as follows typical dimensions which have been found particularly successful in the discrimination of particles in a range of 2 to 200 microns size, this size being the diameter of equivalent spheres:

The sampling tube 30 in this case had a length of 10 inches, with an inlet diameter of 0.42 inch and an exit diameter of 0.16 inch. The spacing between the outlet 34 and plate 50 was 0.080 inch. The diameter of aperture 52 was 0.030 inch. The diameter of each opening in the baffles 54 was 0.046 inch with spacings between the baffles of 0.062 inch, this same spacing existing between the plate 50 and the baffle adjacent thereto. The collecting surface 56 had a length of 10 inches and a width of 0.25 inch. The tube 20 had a length of 3.5 inches and a diameter of 1.75 inches.

Typical operating conditions involved a pumping rate through the tube 42 of 1.12 liters per second, a gauge pressure in the tube 20 of minus 2.2 centimeters of mercury, and a gauge pressure in the chamber 48 of minus 0.12 centimeter of mercury. Under these conditions the collected particles through the length of the surface 56 ranged from about 5 microns to 55 microns with excellent discrimination, the particles at any particular position along the length of surface 56 being very uniform in size. In the case just mentioned the dispersion was of solid plastic spheres.

Through the use of a very small aperture, as indicated, at 52 (this being exaggerated in the drawing for clarity), the particles of a given size entering the chamber 48 will be at substantially the same velocity.

For extreme accuracy, the results may have to be corrected to some extent for large particles the diameters of which may be a substantial fraction of the diameter of the orifice. This correction, however, is at most a minor one and may be usually neglected.

Analysis of the numbers of particles engaging the surface 56 may be effected by counting under a microscope, by chemical or colorimetric analysis of sections of the surface 56, or the like. An actual physical surface at 56 may be replaced by a surface defined by a thin plane of light, the passage of particles across which may be counted, at various points of its length, by dispersion of light to one or more photocells.

Figure 3:
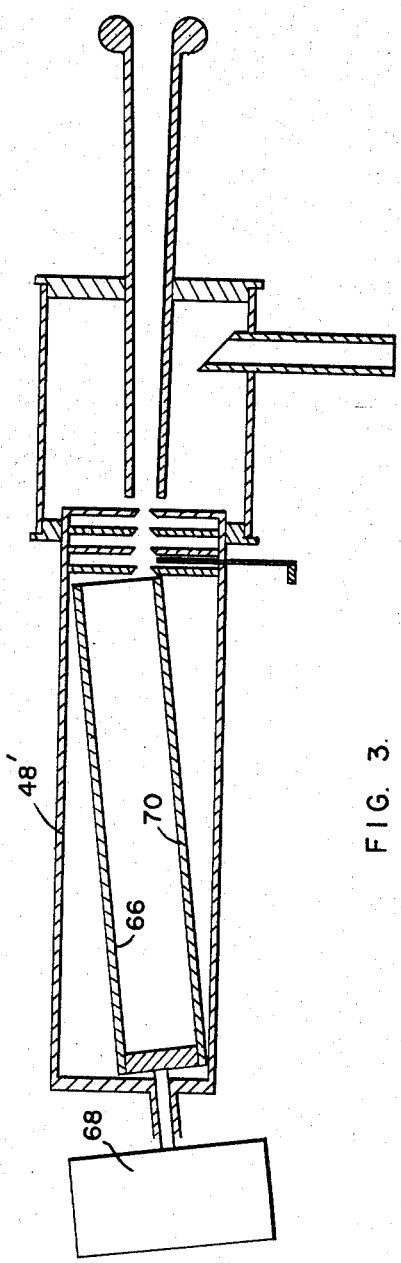
Figure 3 is a similar section showing an arrangement which may be used for continuous aerosol analysis.

For sequential or continuous sampling there may be used the arrangement of apparatus illustrated in Figure 3 in which, the other parts of the apparatus being substantially as already described, the surface 56 may be replaced in a collecting chamber 48' by a cylindrical member 66 having an inner collecting surface 70. This cylinder 66, arranged on a sloping axis, may be driven intermittently or continuously slowly by a motor indicated at 68. The lowermost element of the cylinder then corresponds to the surface 56 for reception of the falling particles, while a time scale is furnished by rotation.

If, instead of mere sampling, it is desirable to collect fine particles of different sizes, the type of apparatus illustrated in Figures 4 and 5 may be used. In this case, the collecting chamber 48" contains bins 72 but is otherwise the same as chamber 48, closed except for the entrance aperture 84. In this case a supply of air or other gas under pressure indicated at 76 passes through an automatic control valve 78 into a chamber 74 wherein it forms a dispersion, in any known fashion, of the material introduced at 80. The dispersing means may be any type of atomizer or the like. The dispersion then enters the converging tube 81, corresponding to 30, and escapes through the opening 82, with a central portion of the dispersion passing through the aperture 84. For the purpose of increasing the quantity collected the aperture 84 may take the form of an elongated slit as indicated in Figure 5, there being indicated in that figure at 82 a suitably corresponding shape of the exit orifice of the tube 81. On the assumption that sharp discrimination of particle sizes is desired there will, of course, pass into chamber 48'' only a relatively small fraction of the material dispersed, that which impinges on the plate containing the aperture 84 being collected and redispersed. While a suction type of flow inducement is not involved, the flow being due to the pressure originating at 78, if the pressure in the chamber 74 is maintained substantially constant there will be a substantially constant pressure in chamber 48'' corresponding to the stagnation pressure of the jet from tube 81 with the attendent production of trajectories uniquely related to particle size. The upper edges of the bins 72 then define the plane or other surfaces which the trajectories intersect to effect the separation.

It will be noted that the difference between separation here involved and that heretofore carried out by dispersion and projection of solid particles or droplets by a jet of gas is that the projection is into a still region of gas wherein the dispersing or projecting gas does not produce currents interfering with sharp separation.

It will be evident that various modifications of the invention may be provided without departing from the scope of the invention as defined in the following claims.

What is claimed is:

1. Apparatus for the discrimination of particles in gaseous suspension comprising a chamber having a restricted aperture in a wall thereof, means including a nozzle directing a stream of gas containing particles in suspension towards said aperture to project particles through the aperture into gas within said chamber, said aperture having an opening area substantially smaller than the internal cross-section of the discharge end of said nozzle so that all particles of the same size entering said aperture do so at substantially the same velocity, and said chamber providing a region of gas having no substantial velocity component in the direction of projection of particles through the aperture and providing an extended free space in said direction of projection so that particles to be discriminated are slowed down to substantially zero velocity in the direction of said projection by gas friction alone, and means defining a surface within said chamber to be traversed by the trajectories of the particles entering the chamber.

2. Apparatus according to claim 1 in which said means defining a surface is constituted by a surface engageable by the particles following said trajectories.

3. Apparatus according to claim 1 in which said means defining a surface is constituted by openings of bins for collecting particles.

4. Apparatus according to claim 1 in which said means defining a surface is constituted by a movable surface engageable by the particles following said trajectories.

5. Apparatus according to claim 1 in which said means directing flow of gas comprises a second chamber exterior to the aperture of the first mentioned chamber, said nozzle opening into said second chamber and being directed towards said aperture, and means for withdrawing gas from said second chamber.

6. Apparatus for the discrimination of particles in gaseous suspension comprising a chamber having an aperture and providing a region of non-turbulent gas, means including a nozzle directing a stream of gas containing particles in suspension towards said aperture to project particles through the aperture into the gas within said chamber, said aperture having an opening area substantially smaller than the internal cross-section of the discharge end of said nozzle, means defining a surface within said chamber to be traversed by the trajectories of the particles entering the chamber, and baffles within said chamber adjacent to the aperture therein and provided with apertures aligned with said aperture to reduce turbulence in the region of entrance of particles into said chamber.

7. Apparatus according to claim 1 comprising a shutter mounted to interrupt passage of particles into said chamber.

8. Apparatus according to claim 5 comprising a shutter mounted to interrupt passage of particles into the first mentioned chamber.

9. Apparatus according to claim 6 comprising a shutter mounted to interrupt passage of particles into said chamber.

10. Apparatus according to claim 5 in which said nozzle has a passage converging in the direction of flow.

11. Apparatus according to claim 1 in which the aperture is provided in a plane wall and in which the stream of gas is directed at right angles to said plane wall.

12. Apparatus according to claim 5 in which the aperture is provided in a plane wall and in which the nozzle is directed at right angles to said plane wall and in axial alignment with the aperture.

13. Apparatus according to claim 1 in which the aperture has a sharp edge provided by bevelling on the side opposite said stream of gas.

14. Apparatus for the discrimination of particles in gaseous suspension comprising a chamber having an aperture and providing a region of non-turbulent gas, means including a nozzle directing a stream of gas containing particles in suspension towards said aperture to project particles through the aperture into the gas within said chamber, said aperture having an opening area substantially smaller than the internal cross-section of the discharge end of said nozzle, and means defining a surface within said chamber to be traversed by the trajectories of the particles entering the chamber, said aperture having a sharp edge provided by bevelling on the side opposite said stream of gas.

References Cited in the file of this patent
UNITED STATES PATENTS

| | | |
|---|---|---|
| 2,684,008 | Vonnegut | July 20, 1954 |
| 2,702,471 | Vonnegut | Feb. 22, 1955 |

FOREIGN PATENTS

| | | |
|---|---|---|
| 659 | Great Britain | Jan. 10, 1911 |
| 6,665 | Great Britain | 1891 |
| 659,531 | Great Britain | Oct. 24, 1951 |